June 30, 1953  A. U. BRYANT  2,643,670
LIQUID FLOW SYSTEM AND APPARATUS
Filed Nov. 14, 1950  5 Sheets-Sheet 1

INVENTOR.
Austin U. Bryant
BY
ATTORNEYS

INVENTOR.
Austin U. Bryant
ATTORNEYS

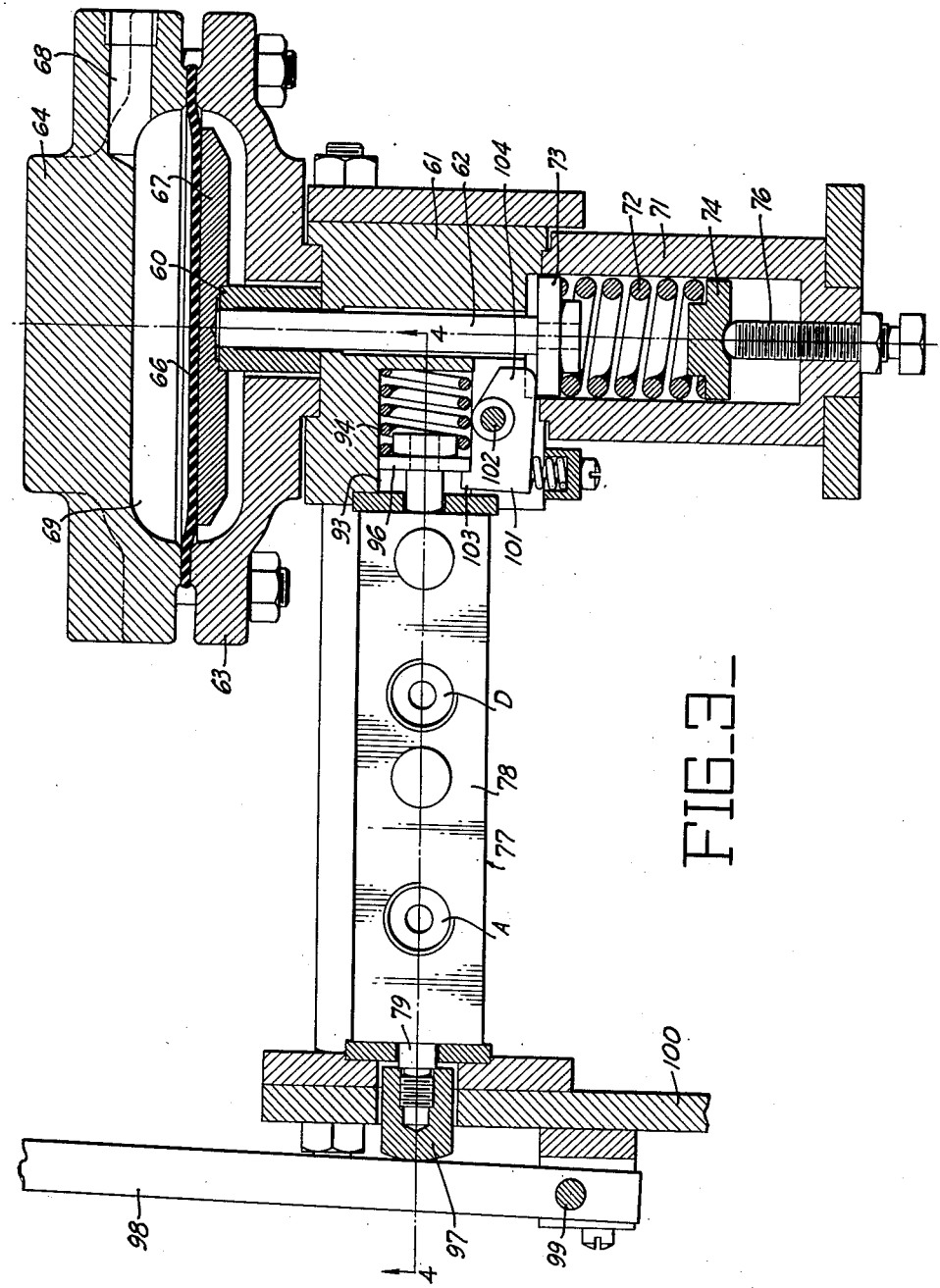

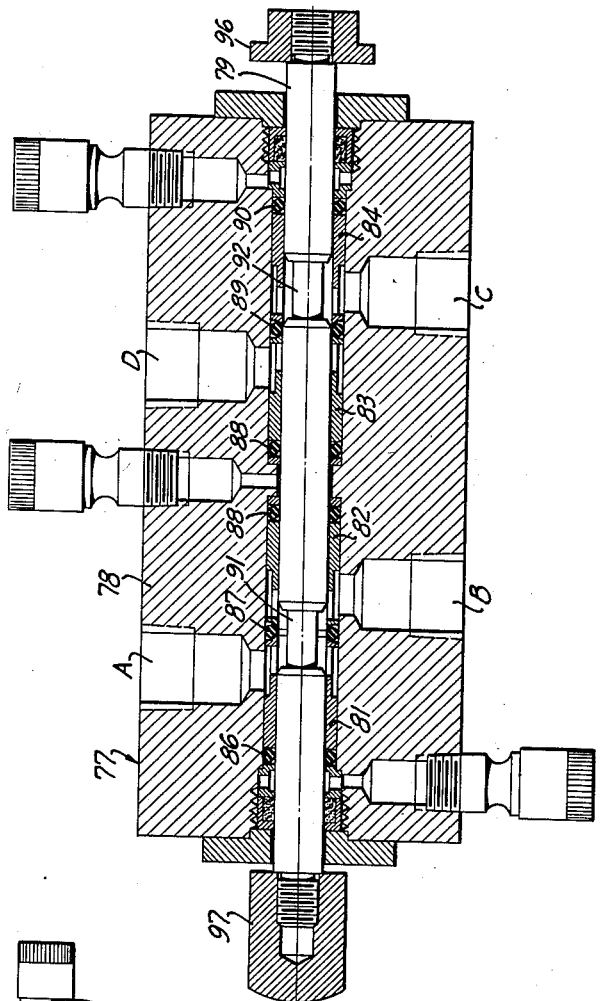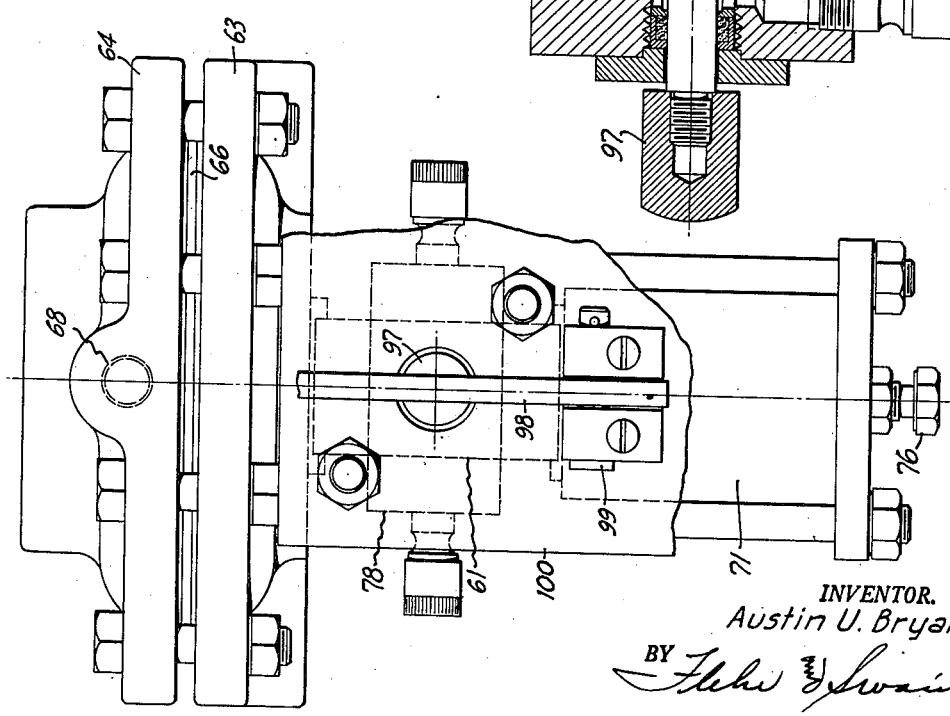

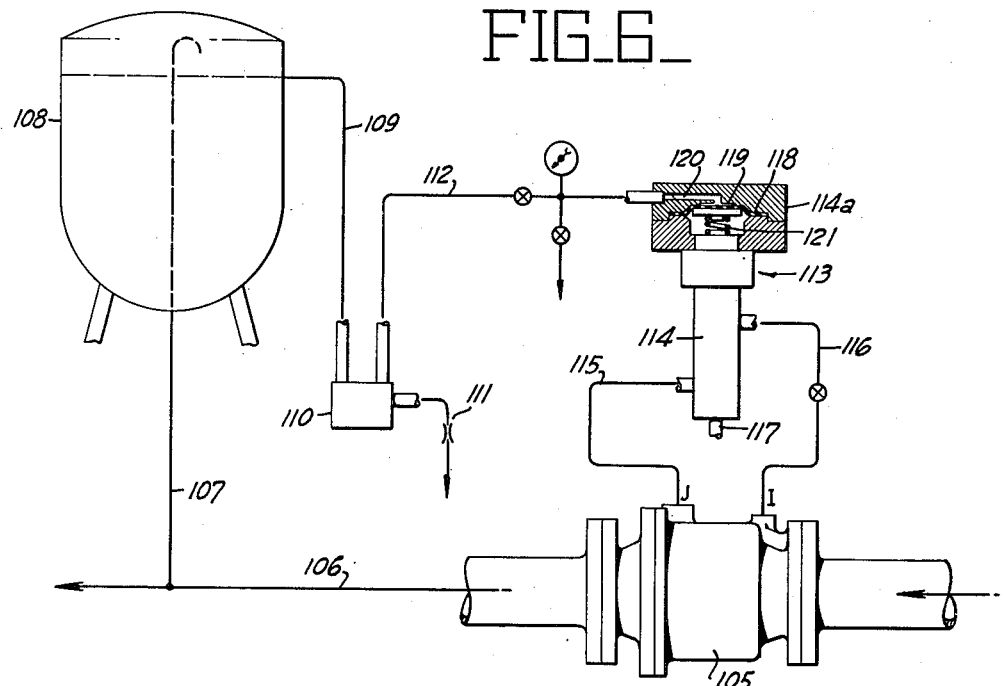
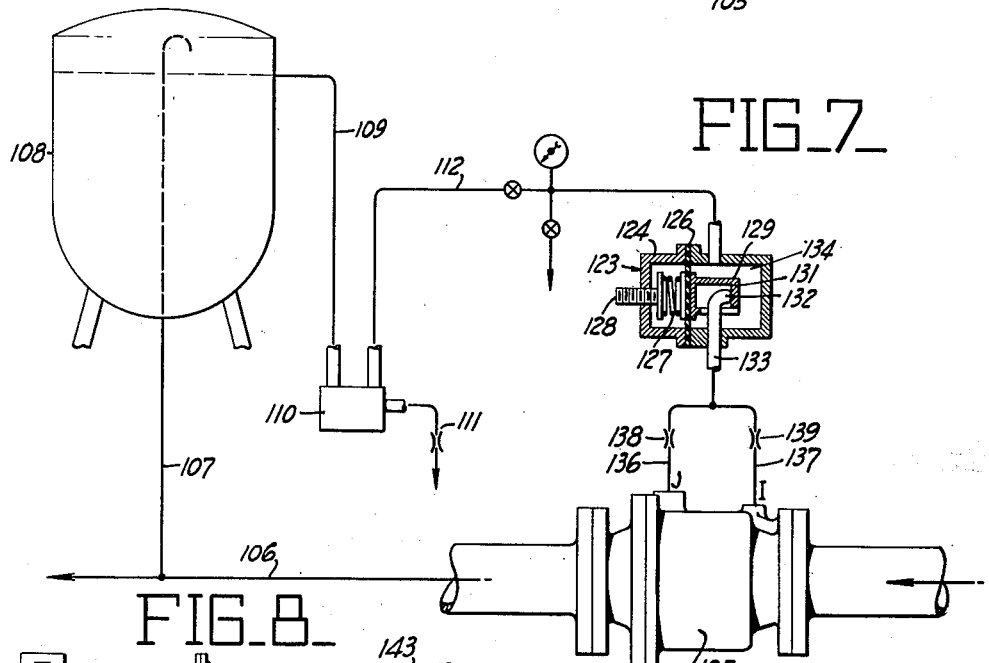
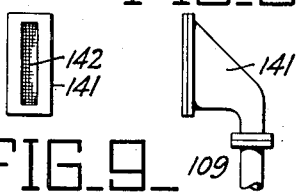

Patented June 30, 1953

2,643,670

UNITED STATES PATENT OFFICE 2,643,670

LIQUID FLOW SYSTEM AND APPARATUS

Austin U. Bryant, Berkeley, Calif., assignor to Grove Regulator Company, Oakland, Calif., a corporation of California Application November 14, 1950, Serial No. 195,580

5 Claims. (Cl. 137—393)

1

This invention relates generally to liquid flow control systems including one or more elevated liquid storage tanks operatively associated with one or more liquid flow pipe lines. The invention also pertains to apparatus suitable for use in such systems.

In many industrial plants it is desirable to control flow of liquid through one or more pipe lines in response to the level of liquid stored in one or more elevated tanks. The pipe line may be connected to supply liquid to the tank, or to related equipment which one desires to control in accordance with the tank liquid level. As a typical example a pump may be connected by a pipe line to discharge water or other liquid into an elevated tank. Liquid may be withdrawn or discharged from the tank intermittently or at a varying rate, whereby the level in the tank may occasionally fall below a desired minimum level. Under such conditions it is desirable to open the pump line to discharge liquid into the tank and thus build up the liquid level. While it is possible to control flow control means by the use of a float controlled valve, apparatus of this type is frequently objectionable.

It is an object of the present invention to provide a flow control system of the above character having novel means for securing automatic operation, and which does not require the use of a float or like apparatus installed in the tank.

Additional objects of the invention will appear from the following description in which the preferred embodiments have been shown in conjunction with the accompanying drawing.

Referring to the drawing:

Figure 3 is a cross-sectional detail illustrating valve apparatus suitable for use in my system.

Figure 4 is a cross-sectional detail taken along the line 4—4 of Figure 3.

Figure 5 is an end view of the apparatus illustrated in Figure 3.

Figure 6 is a schematic view illustrating a simplified form of apparatus incorporating the invention.

Figure 7 is a schematic view illustrating another simplified form of the invention.

Figure 8 is an enlarged detail in side elevation showing a device attached to the upper end of the vertical control pipe of certain embodiments of the apparatus.

2

Figure 9 is a front view of the device shown in Figure 8.

Figure 10 is a view like Figure 8 but showing another arrangement for the same purpose.

Figure 1:
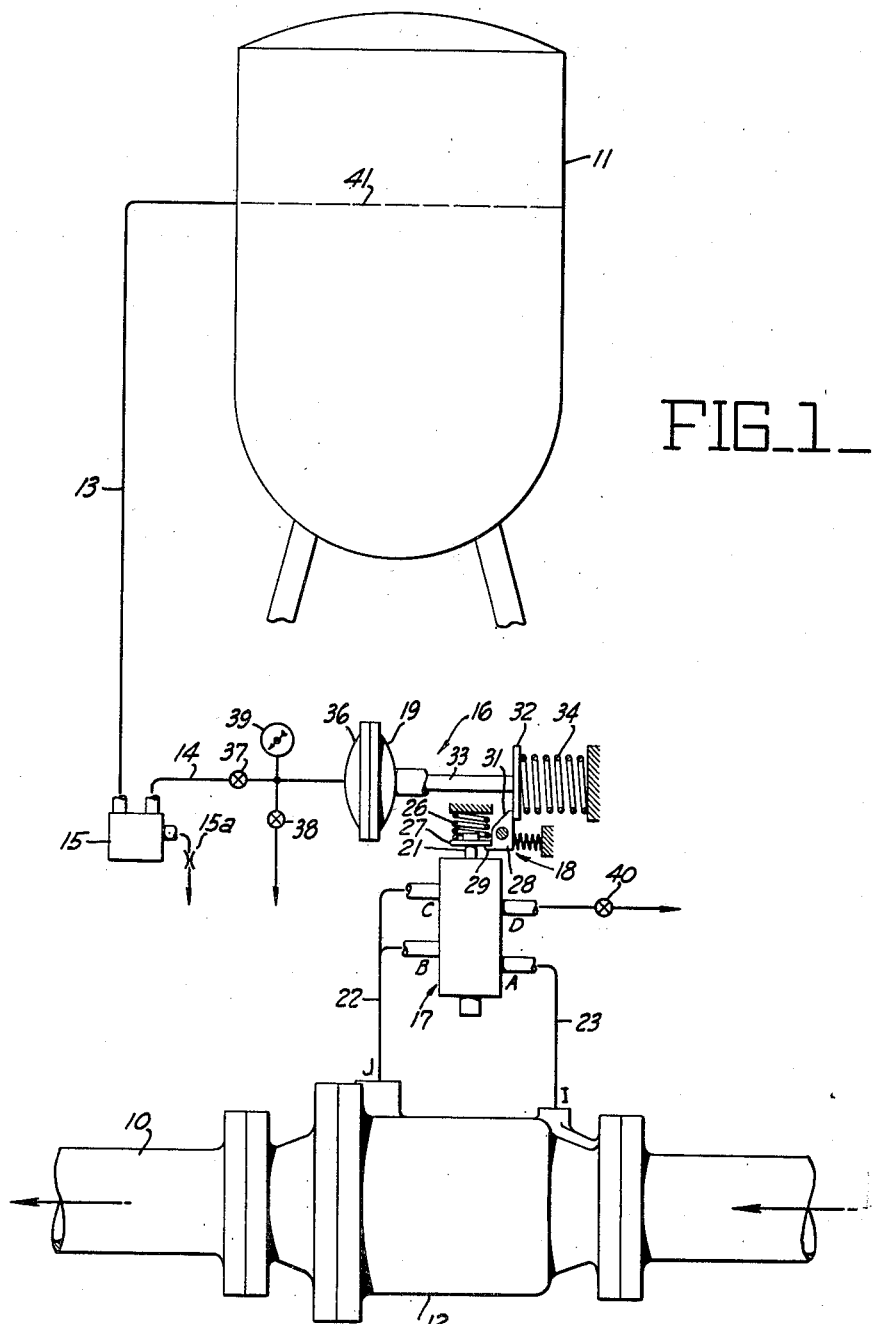
Figure 1 is a diagrammatic view illustrating one type of system incorporating the present invention.

The system illustrated in Figure 1 consists of a liquid flow line 10 which is connected to, or is in some way associated with the elevated liquid tank 11. In a typical instance the pipe 10 may extend from a pump or other source of liquid under pressure, and may be connected to directly or indirectly discharge liquid into the tank 11. Inserted in the pipe line 10 there is a valve 12 which is preferably of the type adapted to be operated by application of fluid pressure to effect opening and closing of the same. A valve which is particularly well adapted for this purpose is disclosed in Bryant 2,353,143 and Grove 2,360,873. A valve of this type, known by the trade name of Grove Flexflo, makes use of a tube formed of resilient rubber which surrounds an inner core. A closed jacket chamber is provided about the tube and is adapted to receive fluid pressure from the inlet side of the valve, or from an independent source. The core forms a barrier whereby when the tube is collapsed it provides a tight shutoff, and when fluid pressure is vented from the chamber surrounding the tube, inlet pressure expands the tube to permit flow around the barrier. The two indicated points of connection (i. e. connecting posts) I and J of the valve 12 represent connections to the inlet passage of the valve, and to the jacket chamber surrounding the rubber tube, respectively.

A small pipe 13 has its upper end connected with the interior of the tank 11, and extends downwardly to a convenient lower level where other parts of the equipment may be placed. The lower portion of the pipe 13 connects with the pipe 14, preferably through a small sediment chamber or trap 15. In addition the trap 15, or the lower portion of the pipe 13, connects with a bleed orifice 15a which can discharge to the atmosphere as indicated.

Pipe line 14 connects with pressure responsive pilot valve apparatus designated generally at 16. The apparatus 16 in this instance consists of a small slide valve 17, which is held in one operating position by the latch means 18. The latch means is associated with the pressure operated means 19 for releasing the same.

The plunger valve 17 can be of the general type disclosed in copending application Serial No. 3,728 filed January 22, 1948, and entitled "Valve Construction." However any conventional slide valve can be employed for this purpose. It is shown provided with four points of connection (i. e. connecting posts) A, B, C and D. For one position of the operating member 21, point A is in communication with point B, but point D is shut off from communication with C. For the other operating position communication between A and B is interrupted, while C and D are placed in communication. Pipes 22 and 23 serve to connect the slide valve 17 to the points of connection I and J of the valve 12 as illustrated. Thus for the first position of the operating member 21, line fluid from I is applied to pipe 23 and through pipe 22 to the chamber about the rubber tube of the valve 12. Under such conditions the valve 12 is closed to pressure applied to its inlet passage. For the other operating positions of the valve 17, pipe 22 vents to the atmosphere through the communicating connections C and D, while at the same time its communication with pipe 23 is interrupted. Thus pressure is removed from the rubber tube of the valve 12, thus permitting the tube to expand and flow to occur past the barrier.

The latch means 18 and pressure responsive means 19 can be constructed as follows: Member 21 is urged in one direction by the compression spring 26, and it is provided with a latch collar 27. A pivoted latch 28 has a shoulder 29 adapted to engage the collar 27. The other extremity 31 of the latch lever is engaged by a collar 32 which is mounted upon the rod 33. The collar 32 and rod 33 are urged in one direction by the compression spring 34. The rod 33 is attached to a pressure operated diaphragm carried within the diaphragm mounting 36. The closed pressure chamber upon one side of the diaphragm is connected to the pipe 14 through the shutoff valve 37. It is also desirable in this connecting pipe to provide a bleed-off valve 38, and a pressure gauge 39. Also point D can be connected to an adjustable vent orifice 40.

Operation of the system and apparatus described above is as follows: Normally the parts are positioned as illustrated in Figure 1, with the latch lever 28 engaged under the collar 27 to retain the plunger valve member 21 in the position illustrated. Under such conditions the points of connection A and B of the slide valve are in communication, and pressure from the inlet connection I is applied through pipes 22 and 23 to the jacket chamber about the rubber tube of the valve 12. The upper end of the pipe 13 is at the level 41. When water is above this level a continuous flow occurs downwardly through the pipe 13 and through the bleed orifice 15a. A substantial liquid pressure head is applied through the pipe 14 corresponding generally to the vertical height of the pipe 13. This pressure is sufficient when applied to the diaphragm of mounting 36 to resist the pressure of spring 34, whereby the latch lever 28 remains latched with the collar 27. In the event the liquid level in the tank falls below the level 41, air is admitted to the pipe 13, thereby interrupting maintenance of pressure in the pipe 14 so that the resulting reduced control pressure permits spring 34 to operate the latch lever 28 to release collar 27. This causes valve member 21 to move to its other operating position, thus interrupting communication between A and B, and establishing communication between C and D. Discharge of liquid from the jacket chamber surrounding the rubber tube of the valve 12 permits this valve to open under applied inlet pressure. Adjustment of the vent orifice 40 serves to adjust the rate with which the valve 12 is permitted to open.

After the apparatus has been tripped as described above, it is necessary to reset it manually. This can be done as follows: Assuming that the level in the tank has been re-established above the level 41 to again maintain the pipe 13 filled with liquid, the valve 37 can be temporarily closed and valve 38 opened to vent liquid and thus remove application of pressure on the diaphragm. Thereafter the valve member 21 is moved to its engaged position manually, valve 38 is closed and valve 37 opened to apply the control pressure. Application of the control pressure permits latch 28 to return to its engaged position, after which the valve member 21 can be released for retention by the latch. During normal operation, and also during such resetting of the apparatus, the gauge 39 can be noted in order to determine whether or not control pressure is being applied by way of pipes 13 and 14.

Figure 2:
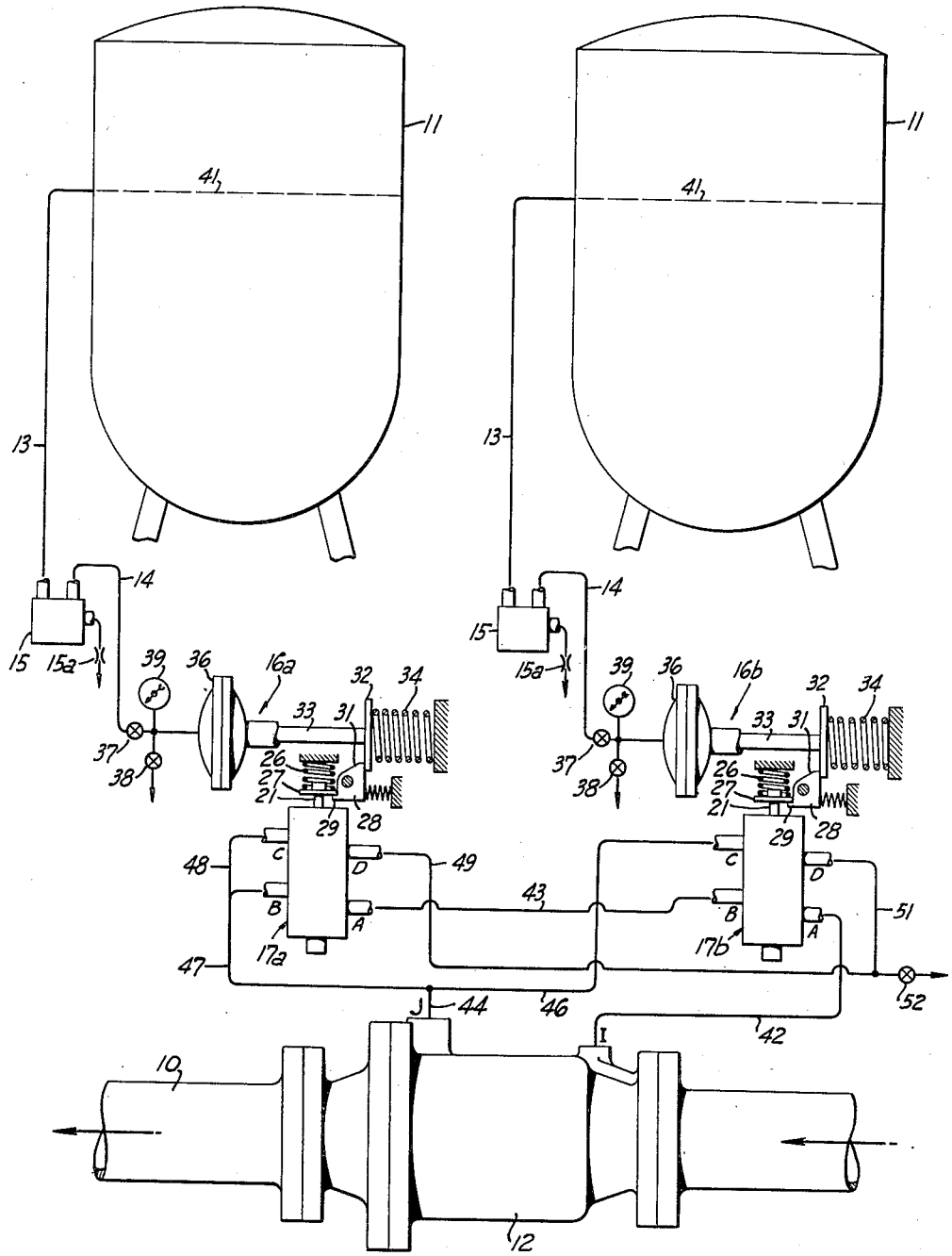
Figure 2 is a diagrammatic drawing illustrating another system incorporating the present invention.

In the system of Figure 2 the equipment employed is the same as in Figure 1, except that the parts, other than the valve 12, have been duplicated. The two slide valves corresponding to the slide valve 17 of Figure 1 have been designated 17a and 17b. Piping serves to connect both of these valves with the points of connection I and J of the valve 12. Thus pipe 42 leading from I connects with the point A of valve 17b. Pipe 43 connects A and B of valves 17a and 17b. Piping 44, 46, 47 and 48 connects point J of valve 12 with C of 17b, and points C and B of 17a. Points D of valves 17a and 17b are connected by pipes 49, 51 with a small adjustable bleed orifice 52.

The apparatus of Figure 2 operates in the same general manner as Figure 1, except that the valve 12 is automatically operated responsive to the condition of either one of the tanks 11. Thus if valve 17a should be tripped, communication of pipe 42 through both valves 17b and 17a with the pipes 47 and 43 is interrupted, and pipes 44 and 46 are vented to the atmosphere through the orifice 52. This orifice can be adjusted to control the rate of opening. Similarly, if valve 17b is tripped, pressure from pipe 42 is no longer applied to the chamber about the rubber tube of valve 12, but this chamber is vented through the orifice 52.

Figures 3 to 5 inclusive illustrate suitable apparatus corresponding to the apparatus 16 of Figure 1. Briefly this apparatus consists of a body 61 which is bored to accommodate the diaphragm rod 62. A diaphragm mounting flange 63 is carried by body 61, and in conjunction with the flanged cover 64, forms a mounting for the flexible operating diaphragm 66. A plate 67 extends over one side of the diaphragm 66, and is engaged by one end of the rod 62. A sleeve 60 also engages the plate 67 and forms means for limiting movement of the diaphragm in one direction. Passage 68 is provided for making connection with the chamber 69 on the upper side of the diaphragm. A tubular member 71 is mounted upon the other end of body 61, and forms a housing for the compression spring 72. One end of this spring engages a collar 73 which is secured to the rod 62, and the other end engages a thrust member 74, which is adjustably held in position by the set screw 76. Adjustment of this screw serves to adjust the tripping pressure.

One side of the body 61 serves to mount the slide or plunger valve 77, which corresponds to the valve 17 of Figure 1. Briefly this valve comprises a body 78 which is bored to accommodate the valve plunger 79, and the various liner bushings 81, 82, 83 and 84. The flow connections A, B, C and D provided in the body, communicate with suitable porting provided in the liner bushings just mentioned. A plurality of seal rings 86 to 90, as for example resilient O-rings, serve to establish the required seals between the valve plunger and the body. The plunger has portions 91 and 92 of reduced diameter to complete the necessary valve porting. For the position illustrated in Figure 4, A and B are in communication, while communication between C and D is interrupted. For the other operating position (not shown) the plunger is moved to the left from the position shown in Figure 4 whereby communication between A and B is interrupted, and communication established between C and D.

One end of the plunger 79 extends into a bore 93 which is formed in the body 61, and which accommodates the compression spring 94. This spring engages a collar 96 on the plunger 79. The other exterior end of the plunger 79 is provided with a thrust cap 97 which engages the manually operated reset lever 98. This lever has a pivotal connection 99 with a mounting plate 100, the latter being carried by the body of the valve 77. When lever 98 is moved manually to the right as viewed in Figure 3, the plunger of the valve 77 is moved to the right to compress the spring 94.

The body 61 is also slotted to accommodate the latch lever 101. This lever is carried by the pivot pin 102, and it has a projecting shoulder 103 adapted to engage the collar 96. The lever also has one end portion 104 in engagement with the collar 73. It will be evident that while the latch lever is in engagement with the collar 96, the plunger 79 of the valve 77 is held in one of its operating positions against the force of compression spring 94. Latch 101 remains in such engaged position as long as sufficient force is applied by diaphragm 66 to offset the pressure of spring 72. When the pressure in chamber 69 is reduced to a point where the force applied by diaphragm 66 is substantially less than the force exerted by the spring 72, then the latch lever 101 is rotated in a counterclockwise direction to release the collar 96 and thus permit the spring 94 to force the plunger 79 to its other operating position.

The apparatus of Figures 3–5 can be reset without first venting control pressure from chamber 69. Thus assuming that normal control pressure has been restored to chamber 69, movement applied to lever 98 serves to re-establish engagement between shoulder 103 and collar 96.

It is not necessary to make use of trigger or latch means for the operation of a pilot valve. In many instances it is possible and desirable to utilize simplified forms of pressure operated valves. Such an arrangement is illustrated in Figure 6. In this instance the main flow control valve 105 is of the same type as described with reference to Figure 1. The pipe line 106 in which the valve 105 is inserted, is shown having a branch connection 107 to the elevated tank 108. It is assumed that the inlet end of the pipe line 106 connects with a source of water or other liquid under pressure, and that one desires to open and close the valve 105 in response to changes in the level of liquid in tank 108. A control line 109, corresponding to the line 13 of Figure 1, connects with the tank and extends downwardly to the sediment trap 110. This trap is provided with a bleed orifice 111, corresponding to the orifice 15a of Figure 1. Line 112 leads from the trap 110 and connects with the diaphragm operated pilot valve 113. The diaphragm operator 114a of this pilot valve is connected to operate the slide valve 114. Pipes 115 and 116 connect the slide valve 114 to the connecting points J and I of the valve 105. The slide valve also has a vent pipe or passage 117.

The diaphragm operator 114a can consist of the flexible diaphragm 118 having a chamber 119 on one side of the same connected by duct 120 with the pipe 112 as illustrated. Compression spring 121 urges the diaphragm against the controlling fluid pressure. The slide valve 114 can be of the O-ring type the same as disclosed with reference to Figures 3 to 5 inclusive, except that only three points of connection are provided. For one position of this slide valve pipes 115 and 116 are placed in communication whereby inlet pressure from I is applied to point J and to the chamber about the resilient rubber tube of the valve 105. For the other operating position the pipe 115 is vented through 117, thus permitting discharge of liquid in the chamber about the resilient tube, whereby the tube is expanded by applied inlet pressure to open the same. At the same time flow through pipe 116 is interrupted.

With the apparatus of Figure 6 the bleed orifice 111 is adjusted whereby a continual flow of liquid occurs downwardly through the control pipe 109, and whereby a substantial control pressure is normally maintained in the pipe 112 and in the chamber 119 above the diaphragm 118. Under such conditions the diaphragm 118 is flexed downwardly against the spring 121 to hold the valve 114 in one operating position. For this operating position the valve 105 is maintained closed. When the liquid level in the tank 108 falls below the upper open end of the pipe 109, a column of liquid is no longer maintained in the pipe 109, and therefore the pressure in chamber 119 is substantially reduced to permit the spring 121 to flex the diaphragm 118 upwardly as illustrated in Figure 6. This serves to move the pilot valve 114 in its other operating position, thereby venting pipe 115 and causing the valve 105 to open with applied inlet pressure. Opening of the valve 105 can replenish the liquid in the tank 108 by upward flow through the pipe 107.

Figure 7 illustrates another arrangement which is particularly adapted for throttling control. In this instance a regulator type pilot 123 is connected to the line 112. As diagrammatically illustrated in Figure 7, this pilot can consist of a body 124 which serves to mount the diaphragm 126. The diaphragm is urged in one direction by the compression spring 127, and the loading thereby obtained can be adjusted by turning the screw 128. A yoke 129 connects the diaphragm with a movable valve member 131. This valve member is adapted to cooperate with the end portion 132 of the inlet pipe 133, which in effect forms a valve seat. The space 134 is connected to the pipe 112.

The pipe 133 of the pilot regulator is preferably connected with the valve 105 as follows: Pipes 136 and 137 are provided with adjustable flow restricting orifices 138 and 139, and both connect with the pipe 133. When no flow occurs through pipe 133 full inlet pressure is applied to pipe 136 and in the chamber about the resilient tube, thereby maintaining the valve 105 closed. For a given rate of flow through the pipe 133, orifice 139 causes a pressure drop in the flow occurring through pipe 137, and this pressure drop is transmitted through pipe 136 and to the chamber about the resilient tube. In a typical instance the reduced pressure thus established in the valve 105 permits partial expansion of the resilient tube thereby permitting a flow rate of corresponding value.

To describe the operation of Figure 7 as a whole, first assume that the level of liquid in the tank 108 is sufficient to completely submerge the upper end of the control pipe 109. Under such conditions continual downflow occurs through the pipe 109 and bleed orifice 111, and sufficient pressure is maintained in pipe 112 whereby this pressure acting upon the diaphragm 126 maintains the valve member 131 sealed against the valve seat 132. Thus full inlet pressure is applied from I to J and the valve 105 is maintained closed. When the water level in tank 108 drops below the upper end of the pipe 109, all of the water flows out of this pipe and consequently the pressure in pipe 112 is reduced to atmospheric. Under such conditions the spring 127 moves the valve member 132 to full open position, thus permitting pipe 132 to vent into the chamber 134, and from thence through pipe 112 and orifice 111. Liquid from the chamber about the resilient tube of valve 105 is vented through pipe 136 and orifice 138, thereby permitting the resilient tube to expand under applied inlet pressure to substantially full open position. For intermediate levels, when the upper open end of pipe 109 is partially submerged, a liquid column is maintained in pipe 109 which has its upper level below the upper end of the pipe, but of sufficient height to maintain substantial pressure in the sediment trap 110. Under such conditions the pressure in chamber 134 assumes an intermediate value whereby the valve member 131 assumes a partly open position. The controlled venting which thus occurs through pipe 133 causes some continual flow of inlet pressure through the orifice 139, whereby the pressure applied to pipe 136 and to the chamber about the resilient tube is of such value that the tube is permitted to partially but not fully expand. Thus with such an operating condition some flow may occur through the valve 105, and this throttled flow when applied to the line 107 can be sufficient to maintain the level in tank 108 substantially constant.

In the apparatus of Figure 7 it will be noted that for intermediate throttling positions, and also for full open conditions, a continual venting of liquid occurs from I through the pipe 133. This liquid must flow through pipe 112 and the bleed orifice 111, together with liquid flowing downwardly through the control pipe 109. Therefore the bleed orifice 111 must be adjusted or proportioned accordingly.

Instead of making use of a single pipe connection to the tank, the upper end of the control pipe 109 can connect with the tank by the use of special means such as illustrated in Figures 8 to 10 inclusive.

In Figures 8 and 9 the upper end of the pipe 109 is connected to a device 141 which provides a passage enlarged in a vertical direction and which communicates with the interior of the tank through the vertically extending port 142. This port can be screened over as illustrated. When the port 142 is partially submerged, the amount of liquid flowing through the same is insufficient to maintain the pipe 109 completely filled with liquid. Therefore under such conditions the liquid in pipe 109 seeks a level depending upon the flow rate through the port 142, and which level determines the pressure maintained in the pipe 112. As shown in Figure 10 the upper end of the pipe 109 can also be connected with two branch pipes 143 and 144, which are at different levels and which communicate with the interior of the tank 108. The use of two or more pipes in this manner likewise facilitates throttling action in substantially the same manner as the arrangement of Figures 8 and 9. Devices as shown in Figures 8–10 can be used to advantage with the arrangements of Figures 6 and 7.

I claim:

1. In a liquid flow control system including an elevated liquid storage tank and a main liquid flow line, valve means adapted to control flow of liquid through said line, operating means for said valve means including a chamber adapted to receive fluid under pressure to control operation of the same, a depending pipe line having its upper end connected to said tank, a bleed orifice communicating with the lower end of said pipe line and through which liquid is adapted to continuously bleed when the upper end of the pipe line is immersed by liquid in the tank, ported means connected to the upper end of the pipe line for flow of liquid from the tank to said line, said means providing flow communication over a vertical distance substantially greater than the flow passage through the pipe, and a pressure connection from the lower portion of said pipe line to said chamber.

2. In a liquid flow control system including an elevated liquid storage tank and a main liquid flow line, a valve in said flow line adapted to control flow of liquid therethrough, said valve having a chamber adapted to receive fluid under pressure to cause closing of the valve, a pilot valve having connection to a source of fluid under pressure and also a connection with the chamber of said valve, said pilot valve being movable between one operating position in which fluid pressure is applied to said chamber and a second operating position in which pressure is vented from said chamber to cause opening of said valve, means for continuously urging said pilot valve toward said second named position, latch means for retaining said pilot valve in said first named position, fluid pressure responsive means for releasing said latch means, a depending pipe line having its upper end communicating with said tank, a bleed orifice communicating with the lower end of said pipe line and through which liquid is continuously bled while the upper end of the pipe line is immersed by liquid in the tank, and a pipe line communicating from the lower end of said control pipe and connected to said pressure responsive means.

3. In a liquid flow control system including an elevated liquid storage tank and a main liquid flow line, a valve in said flow line adapted to control flow of fluid therethrough, said valve having a chamber adapted to receive fluid under pressure to cause closing of the valve, a pilot valve having connection to a source of fluid under pressure and also a connection with the chamber of said valve, said pilot valve being movable between a first operating position in which fluid pressure is applied to said chamber and a second operating position in which pressure is vented from said chamber to cause opening of said valve, spring means for continuously urging said pilot valve toward said second position, fluid pressure means for urging said pilot valve to said first position, a depending pipe line having its upper end communicating with said tank, a bleed orifice communicating with the lower end of said pipe line and through which liquid is continuously bled while the upper end of the pipe line is immersed by liquid in the tank, ported means connected to the upper end of the pipe line for flow of liquid from the tank to said line, said means providing flow communication over a vertical distance substantially greater than the flow passage through the pipe, and a pipe line communicating from the lower end of said depending pipe line and connected to said fluid pressure means of said pilot valve.

4. In a liquid flow control system including an elevated liquid storage tank and a main liquid flow line, a valve in said flow line adapted to control flow of liquid therethrough, said valve having a chamber adapted to receive fluid under pressure to control operation of said valve, means including a flow restricting orifice connecting said chamber to the inlet side of said valve, a pilot valve adapted to vent said connecting means, said pilot valve being normally urged toward venting position and urged by pressure responsive means toward closed position, a depending pipe line having its upper end communicating with said tank, a bleed orifice communicating with the lower end of said pipe line and through which liquid is continuously bled while the upper end of the pipe line is immersed by liquid in the tank, and a pipe line communicating from the lower end of said control pipe and connected to said pressure responsive means, said pilot valve venting said connecting means into said pressure responsive means.

5. In a liquid flow control system including an elevated liquid storage tank and a main liquid flow line, a valve in said flow line adapted to control flow of liquid therethrough, said valve having a chamber adapted to receive fluid under pressure to cause closing of the valve, means for connecting through a flow restricting orifice the inlet side of said line to said chamber, a pressure operated pilot valve for venting said connecting means into a control chamber provided with flexible diaphragm means for controlling the pilot valve, a depending pipe line having its upper end communicating with said tank, a bleed orifice comunicating with the lower end of said pipe lines and through which liquid is continuously bled while the upper end of the pipe line is immersed by liquid in the tank, and a pipe line communicating from the lower end of said pipe to said control chamber, whereby when the pilot valve is closed the control chamber is supplied only with the pressure provided by the lower end of the pipe line and when the pilot valve is open the control chamber is supplied with a combination of that fluid pressure and the fluid pressure provided by the venting of said connecting means.

AUSTIN U. BRYANT.

References Cited in the file of this patent

UNITED STATES PATENTS

| Number | Name | Date |
|---|---|---|
| 254,944 | Evans | Mar. 14, 1882 |
| 1,188,112 | Temple | June 20, 1916 |
| 2,171,394 | Christian | Aug. 29, 1939 |
| 2,178,866 | Thomas | Nov. 7, 1939 |

FOREIGN PATENTS

| Number | Country | Date |
|---|---|---|
| 90,044 | Sweden | 1937 |